June 12, 1956
R. HARDT
2,749,982
APPARATUS FOR DETERMINING PRESSURE IN
SPLITTING RESILIENT MATERIALS
Filed March 5, 1954
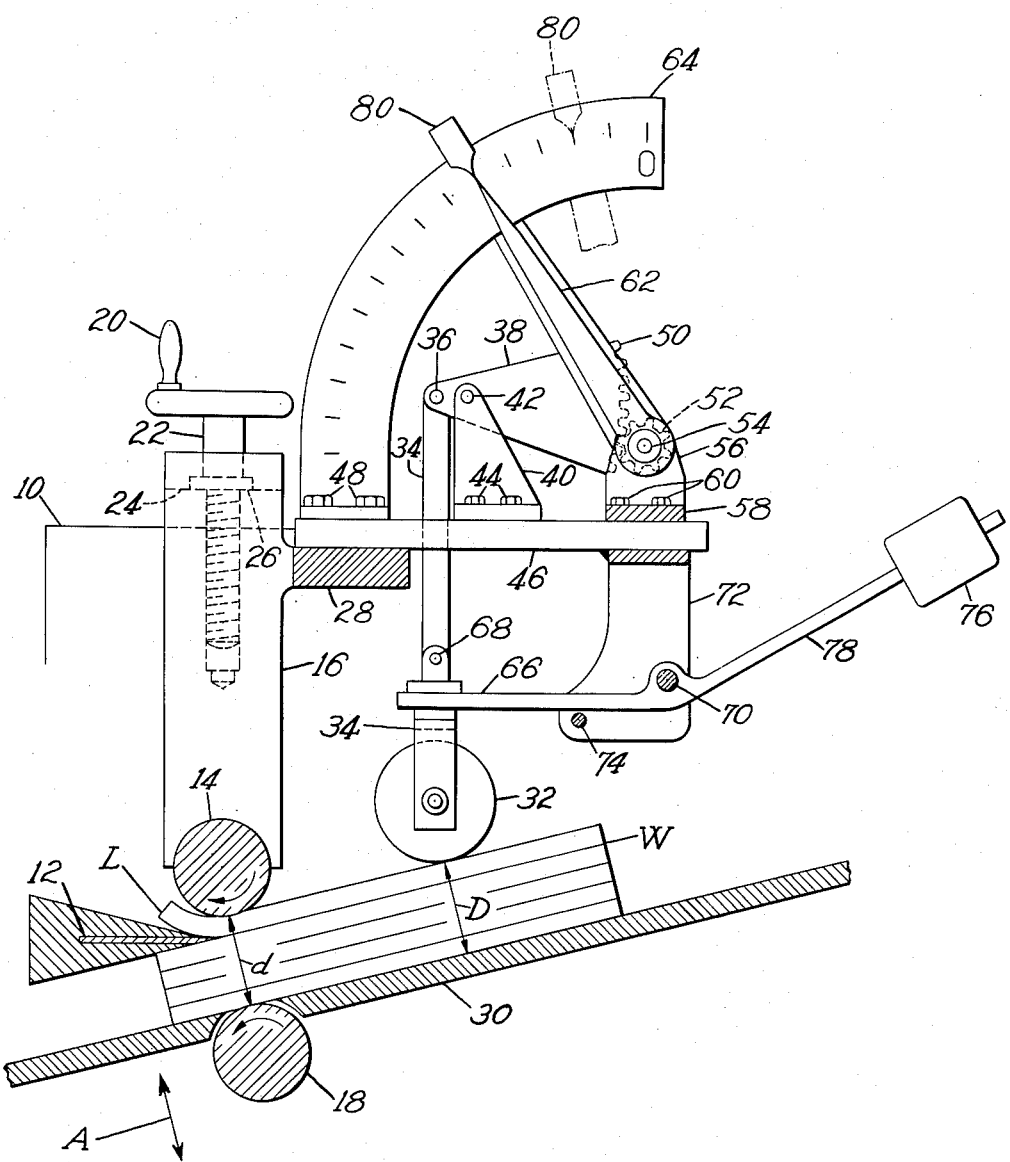
Inventor
Rudolf Hardt
By his Attorney

United States Patent Office 2,749,982
Patented June 12, 1956

2,749,982

APPARATUS FOR DETERMINING PRESSURE IN SPLITTING RESILIENT MATERIALS

Rudolf Hardt, Eschweiler, Germany, assignor to Maschinenfabrik Turner Aktiengesellschaft, Oberursel (Taunus), Germany, a corporation of Germany Application March 5, 1954, Serial No. 414,424

Claims priority, application Germany March 17, 1953

4 Claims. (Cl. 164—39)

The present invention relates to splitting machines and more particularly to apparatus indicating the compression of material during feeding of the material to the splitting instrumentality.

In the splitting of soft resilient materials, such as foam rubber, great difficulty has been experienced in splitting from a relatively thick piece of material several layers having the same thickness. For economic reasons it is desirable to manufacture such resilient materials in thick sections. Then they must be split into several layers, each of equal thickness so that the entire thickness may be useable in the thinner form.

In feeding material to a splitting knife, whether it be of the stationary or rotating band type, it is necessary to apply a certain amount of feeding pressure to the workpiece. In the soft materials it follows that the workpiece will be deflected or compressed a considerable amount in order to obtain the necessary feeding pressure. Therefore, if the same pressure is not applied when a subsequent layer is split from the workpiece the thickness of that layer will vary due to the unequal amounts of compression per unit of thickness.

It is an object of the present invention to provide an apparatus which will assist the operator in applying the proper feeding pressure to a workpiece as it is presented to a splitting knife.

In splitting machines of the stationary knife and belt knife type the feeding pressure for presenting a workpiece to the knife is provided by a feed roll and a gage roll. The gage roll, according to conventional practice, is adjusted in a fixed relation to the cutting edge of the knife to determine the thickness of the layer to be split off. The feed roll and a table associated therewith are then raised until sufficient pressure is applied to the workpiece so that it will be fed to the knife. The feed roll and gage roll are usually driven by power.

According to the various features of the present invention a feeler roll is provided adjacent the gage roll with its lowermost surface the same distance from the supporting table as the distance between the feed roll and the gage roll. The feeler roll is mounted by a linkage system supported by the gage roll framework and is so balanced that it may exert only a very slight pressure in a downward direction. Therefore, as a workpiece is compressed between the feed roll and the gage roll, the feeler roll will be displaced upwardly. This displacement will cause movement of a pointer which is actuated by the mentioned linkage system. The reading of the pointer upon a scale is indicative of the displacement of the workpiece and likewise the pressure exerted on the workpiece between the feed and gage rolls. A marker is likewise provided so that the reading of the pointer may be registered on the scale.

Knowing the number of layers into which a given workpiece is to be split it is possible to determine the amount of compression or pressure to be applied to the workpiece on each passage through the machine. The amount of compression indicated by the needle reading on this scale for the first layer is divided by the number of layers desired and the reading on the scale is reduced by that increment each time the workpiece passes through the machine. Thus, it is possible to split several layers of equal thickness from a workpiece of thick section.

The above and other features of the invention, including various novel details of construction and combination of parts, will now be more particularly described by reference to the accompanying drawing and pointed out in the claims.

In the drawing,

The single figure is a view in elevation, with certain portions in section, of a device embodying the features of the present invention and a diagrammatic depiction of the basic elements of a splitting machine.

The present invention is applicable to any one of several well-known types of splitting machines and for that reason the elements of the splitting machine are depicted in a more or less diagrammatic form. These elements include a main frame 10, a knife 12, which is herein shown as being mounted in fixed relationship to the frame 10, a gage roll 14 each end of which is rotatably mounted in a sub-frame 16, and a feed roll 18. The gage roll is adjusted in relation to the knife, to determine the thickness of a layer to be split, by a hand wheel 20 which is integral with a member 22. An extension 24 of the sub-frame 16 rests on a collar 26 also integral with the member 22. The member 22 is threaded into the frame 10. A similar arrangement of parts is provided for the opposite end of the gage roll 14 so that the gage roll 14 may be adjusted at a fixed distance away from the knife 12 and in parallel relation thereto. A cross member 28 connects the two sub-frames 16.

As has already been explained, the thickness of a layer to be split is determined by the relative relationship of the gage roll 14 and the knife 12. A workpiece W is introduced between the gage roll 14 and the feed roll 18. The feed roll 18 and usually the gage roll 14 or the feed roll alone are driven in the direction shown by the arrows. The feed roll 18 and a table 30 are adjustable in the direction of the double-headed arrow A so that sufficient pressure will be exerted upon the workpiece W to cause it to be driven and split by the knife 12. The means for mounting, adjusting and driving the feed roll 18 are well-known in the art and since they form no part of the present invention, they are not shown herein.

A feeler roll 32 is provided adjacent the gage roll 14 and is rotatably mounted within the bifurcated end of a link 34. The link 34 is pivotally connected at 36 to a member 38 which, in turn, is pivotally connected to a bracket 40 at 42. The bracket 40 is secured by screws 44 to a plate 46 which is fastened by screws 48 to the cross member 28. Thus, the plate 46 is secured in fixed relationship to the gage roll 14. A gear segment 50 is formed on the member 38 and engages a pinion 52 which is secured to a shaft 54 journaled in upstanding lugs 56 (only one of which is shown) of a bracket 58 secured to the plate 46 by screws 60. A pointer 62 is also secured to the shaft 54 and is arranged to read upon an arcuate scale 64 which is secured to the plate 46 by the screws 48. It will be apparent that displacement of the feeler roll 32 acting through the link 34, the segment 50 and the pinion 52 will cause the pointer 62 to indicate such displacement on the scale 64. In order to assure that the feeler roll 32 will move substantially in a vertical plane a link 66 is pivotally connected to the link 34 at 68. The link 66 is pivotally connected to a pin 70 which extends between the flanges of a bifurcated bracket 72 which in turn is secured to the plate 46. A pin 74 also extends between the flanges of the bracket 72 to limit the downward motion of the link 66 and the feeler roll 32. By means of the pin, when there is no workpiece in the machine, the lowermost portions of the feeler roll 32 and of the gage roll 14 are in a plane which is parallel to the top of the table 30. A counter weight 76 is mounted upon an extension 78 of the link 66. This counter weight is positioned so that the feeler roll exerts only a very slight downward pressure.

A second pointer 80 is also arranged to read on the scale 64 and may be set in any desired location manually since it is freely mounted on the shaft 54 and held from random rotation by frictional engagement with one of the lugs 56.

In order to assure that each layer L split from a workpiece W be of equal thickness, it is necessary that the pressure between the feed roll 14 and the gage roll 18 be the same as subsequent layers are split. The workpiece W in the present instance is shown as being arranged to be split into five layers L. When the first layer L is split off, the workpiece is compressed an amount $D-d$, this being the difference between the free thickness D and the thickness $d$ of the material between the feed roll 14 and the gage roll 18. Because of the counter weight 76, the feeler roll 32 compresses the workpiece W no more than a negligible amount. Thus the amount of compression $(D-d)$ is registered on the scale 64 by the pointer 62. It has been found that for the purposes of the present invention it is, in most cases, sufficient to assume that the amount of compression of any given thickness of a material is directly proportional to the pressure applied by the rolls 14 and 18. As each successive layer is split off of the workpiece W the pressure exerted by these rolls must be maintained the same. This can be achieved by proportionately reducing the amount of compression. To assist in this, the operator may manually adjust the marker 80 to indicate the amount of compression necessary for each successive cut as the table 30 and the feed roll are raised.

To illustrate this principle the present workpiece W is to be split into five layers L of equal thickness. The pointer 62 indicates that five units of compression have been applied by the rolls 14 and 18. That means that the pressure is distributed through a thickness equal to five times L. If the same pressure is applied to the workpiece on its next passage through the machine the pressure, being distributed through four fifths the thickness, will cause the material to be compressed only four fifths the original amount. The pointer 62 would therefore show four units of displacement on the scale 62 when the table 30 and the feed roll 18 have been properly adjusted for the second passage of the workpiece W through the machine. The marker 80 may be used as an aid in marking the reading on the scale 64 the amount of compression to be applied during any particular splitting operation and is shown in a phantom position to indicate the amount of compression to be applied in the third splitting operation of the workpiece W. As a further illustration, the reading on the scale 62 is reduced on each successive passage of a workpiece by an increment equal to the original reading divided by the number of layers into which the workpiece is to be split.

In some cases it has been found that certain materials do not compress in a linear manner, that is, the amount of compression of a given thickness is not directly proportional to the pressure applied. When splitting these materially it is a simple matter to determine the necessary compression for each cut empirically.

Having thus described my invention, what I claim as new and desire to secure by Letters Patent of the United States is:

1. A splitting machine having a splitting knife, a pair of cooperative rolls for feeding work pieces to said knife, said knife being located to cut the workpieces as they are fed by the rolls and while they are compressed therebetween, said rolls being relatively adjustable heightwise with respect to said knife, a work support adjacent the infeed side of one of said rolls and adjustable therewith, a feeler adjacent the other of said rolls and opposite said support, said feeler having a normal position with respect to its adjacent roll and also being displaceable with respect to said roll in response to the presence of a work piece between the feeler and the work support, said feeler being spaced from said other roll a distance sufficient for it to engage an uncompressed portion of a workpiece, and means for indicating the amount of displacement of said feeler whereby the magnitude of compression of a work piece being fed by said rolls will be readily discernible.

2. A splitting machine having a splitting knife, a gage roll, a feed roll which is adjustable with respect to said knife, said feed and gage rolls being arranged to compress workpieces and to feed compressed portions thereof to the cutting edge of said knife, a work support adjacent the infeed side of said feed roll and adjustable therewith, a feeler adjacent said gage roll and opposite said work support, said feeler having a normal position with respect to said gage roll and also being displaceable with respect to said gage roll in response to the presence of a work piece between the feeler and the work support, said feeler being spaced from said other roll a distance sufficient for it to engage an uncompressed portion of a workpiece, and means for indicating the amount of displacement of said feeler whereby the magnitude of compression of a work piece being fed by said feed roll and gage roll will be readily discernible.

3. A splitting machine having a splitting knife, a gage roll, a feed roll which is adjustable with respect to said knife, said feed and gage rolls being arranged to compress workpieces and to feed compressed portions thereof to the cutting edge of said knife, a work support adjacent the infeed side of said feed roll and adjustable therewith, a feeler roll adjacent said gage roll and opposite said work support, said feeler roll being normally positioned the same distance from said work support as the distance between said feed roll and said gage roll, said feeler roll being displaceable with respect to said gage roll in response to the presence of a work piece between the feeler roll and the work support, said feeler roll being spaced from said other roll a distance sufficient for it to engage an uncompressed portion of a workpiece, counterbalancing means arranged to reduce the pressure of the feeler roll upon a work piece to a minimum, and means for indicating the amount of displacement of said feeler roll whereby the magnitude of compression of a work piece being fed by said feed roll and gage roll will be readily discernible.

4. A splitting machine having a splitting knife, a gage roll, a feed roll adjustable with respect to said knife, said feed and gage rolls being arranged to compress workpieces and to feed compressed portions thereof to the cutting edge of said knife, a work support adjacent the infeed side of said feed roll and adjustable therewith, mounting means for said gage roll which are adjustable with respect to said knife, a feeler roll carried by said gage roll mounting means, said gage roll being opposite said work support and the same distance therefrom as the distance between said feed and gage rolls, said feeler roll being displaceable with respect to said gage roll in response to the presence of a work piece between the feeler roll and the work support, said feeler roll being spaced from said other roll a distance sufficient for it to engage an uncompressed portion of a workpiece and means for indicating the amount of displacement of said feeler roll whereby the magnitude of compression of a work piece being fed by said feed roll and gage roll will be readily discernible.

References Cited in the file of this patent

UNITED STATES PATENTS

| | | |
|---|---|---|
| 1,382,755 | Baxter | June 28, 1921 |
| 1,530,067 | Young | Mar. 17, 1925 |
| 2,312,216 | Keeler | Feb. 23, 1943 |
| 2,657,468 | Lyons | Nov. 3, 1953 |

FOREIGN PATENTS

| | | |
|---|---|---|
| 802,643 | Germany | Feb. 15, 1921 |